US010288187B2

(12) United States Patent
Vogt et al.

(10) Patent No.: US 10,288,187 B2
(45) Date of Patent: May 14, 2019

(54) DEVICE FOR REGULATING THE FLOW OF A FLUID

(71) Applicant: ASCO NUMATICS GMBH, Oelbronn-Duerrn (DE)

(72) Inventors: Martin Vogt, Kirchheim/Teck (DE); Max Leinen, Langensteinbach (DE); Felix Ams, Kaempfelbach (DE)

(73) Assignee: Asco Numatics GmbH, Oelbronn-Duerrn (DE)

( * ) Notice: Subject to any disclaimer, the term of this patent is extended or adjusted under 35 U.S.C. 154(b) by 0 days.

(21) Appl. No.: 15/498,874

(22) Filed: Apr. 27, 2017

(65) Prior Publication Data

US 2017/0314699 A1  Nov. 2, 2017

(30) Foreign Application Priority Data

Apr. 29, 2016 (EP) .................................... 16167735

(51) Int. Cl.
| | |
|---|---|
| *F16K 11/02* | (2006.01) |
| *F16K 31/06* | (2006.01) |
| *F16K 31/08* | (2006.01) |
| *F16K 31/10* | (2006.01) |

(52) U.S. Cl.
CPC ........ *F16K 31/0627* (2013.01); *F16K 11/022* (2013.01); *F16K 31/0624* (2013.01); *F16K 31/0641* (2013.01); *F16K 31/0679* (2013.01); *F16K 31/0682* (2013.01); *F16K 31/082* (2013.01); *F16K 31/10* (2013.01)

(58) Field of Classification Search
USPC .................................... 137/625.44; 335/184
See application file for complete search history.

(56) References Cited

U.S. PATENT DOCUMENTS

| | | | |
|---|---|---|---|
| 3,233,064 A | 2/1966 | Blomquist et al. | |
| 3,951,378 A * | 4/1976 | Manor .................. | F16K 31/082 251/65 |
| 8,104,510 B2 | 1/2012 | Ams et al. | |
| 8,613,421 B2 | 12/2013 | Ams et al. | |
| 9,249,895 B2 * | 2/2016 | Hettinger .............. | F16K 27/003 |
| 9,524,818 B2 | 12/2016 | Kahl et al. | |
| 2002/0066480 A1 * | 6/2002 | Anderson .......... | F15B 13/0438 137/82 |

(Continued)

FOREIGN PATENT DOCUMENTS

| | | |
|---|---|---|
| DE | 20 2011 004 616 | 6/2011 |
| EP | 2 068 056 | 6/2009 |

(Continued)

*Primary Examiner* — John Fox
(74) *Attorney, Agent, or Firm* — Collard & Roe, P.C.

(57) ABSTRACT

A device for regulating the flow of a fluid id formed with a valve housing having at least two valve ports. A first fluid path that extends between the at least two valve ports is formed in the valve housing. A first valve seat is assigned to the first fluid path. A first closing element is arranged to be coupled to the first valve seat to block or release the first fluid path, and an electromagnetic actuating unit for actuating the closing element. The actuating unit has a first electromagnet and a second electromagnet that are coupled to the closing element via a coupling mechanism. The first and second electromagnets additively act on the closing element to displace the closing element between at least two positions.

17 Claims, 5 Drawing Sheets

(56) References Cited

U.S. PATENT DOCUMENTS

2003/0107018 A1* 6/2003 Hettinger .............. F16K 11/052
                                                    251/129.19
2010/0123093 A1* 5/2010 Beyer ................. F16K 31/0641
                                                    251/129.15

FOREIGN PATENT DOCUMENTS

| EP | 2 365 239 | 9/2011 |
| GB | 2504254 | 1/2014 |
| WO | WO 2015/149179 | 10/2015 |

* cited by examiner

DEVICE FOR REGULATING THE FLOW OF A FLUID

CROSS-REFERENCE TO A RELATED APPLICATION

The invention described and claimed hereinbelow is also described in European Patent Application 16 167 735.6, filed on Apr. 29, 2016. The European Patent Application, the subject matter of which is incorporated herein by reference, provides the basis for a claim of priority of invention under 35 U.S.C. 119(a)-(d).

BACKGROUND OF THE INVENTION

The present disclosure relates to a device for regulating the flow of a fluid, comprising a valve housing having at least two valve connections, wherein at least one fluid path that extends between the at least two valve connections is formed in the valve housing, comprising at least one valve seat that is assigned to the at least one fluid path, at least one closing element that can be coupled to the at least one valve seat in order to block or release the at least one fluid path, and an electromagnetic actuating unit for actuating the closing element.

Devices that are related to this type device are known, for example, from U.S. Pat. No. 8,613,421 B2 and from U.S. Pat. No. 8,104,510 B2.

U.S. Pat. No. 8,104,510 B2 describes a valve arrangement for liquid or gaseous media, which comprises a valve element in the form of a so-called flapper. The valve element is designed as an elastically accommodated, deflectable flap. The valve element comprises a closing element which can alternatively close one of two valve seats and release the other valve seat. Flow regulation is effectuated in this way. The associated valve arrangement comprises three valve connections in one valve housing, which define two fluid paths, between which it is possible to switch, back and forth, by the valve element and the closing element.

For actuating the valve, an electromagnet is provided, which comprises a pull-in armature that acts on an actuating element which has a fork-like design and is coupled to the closing element. The forked actuating element is situated between the pull-in armature of the electromagnet and the closing element of the valve element and provides a coupling between the two components.

The electromagnet is designed as a single-acting magnet. The electromagnet acts against the force of a closing spring. Therefore, in an energized state of the electromagnet, the valve arrangement can operate in a first state and, in a non-energized state of the electromagnet, the valve arrangement can be operated in a second state, to which states there are assigned corresponding positions of the valve element.

U.S. Pat. No. 8,613,421 B2 describes a device for regulating the flow of a liquid or gaseous medium, which comprises a valve arrangement that has a valve housing having three valve connections, wherein two fluid paths are defined between the three valve connections, which can be selectively activated or blocked by a deflectable valve element which has a closing element. The valve element comprises a closing element which has a bell-like design, for example, and is pivotable or deflectable to block a first valve connection, in a first position, and block a second valve connection, in a second position. In addition to the closing element, the valve element further comprises a support, on which an actuating section is formed. The actuating section can be loaded and deflected approximately transversely to its longitudinal extension to swivel the closing element in the manner similar to that of a bell.

An electromagnet comprising a pivoted armature is provided for actuating the valve arrangement, according to U.S. Pat. No. 8,613,421 B2. Actuating elements in the form of flat springs or leaf springs, which can act on an actuating section of the support of the valve element, are formed on the pivoted armature. The pivoted armature can be swiveled back and forth between two positions. Each of the switching positions of the pivoted armature corresponds to a corresponding position of the closing element.

In an energized state of the electromagnet, the valve arrangement is in a first state, in which, for example, a first fluid path is activated. In a de-energized state of the electromagnet, the valve arrangement is in a second state, in which, for example, a second fluid path is activated. The other fluid path is preferably blocked. Permanent magnets, which effectuate a restoring force in a manner similar to that of a spring, are assigned to the pivoted armature to return the pivoted armature or the closing element.

The devices described in U.S. Pat. Nos. 8,613,421 B2 and 8,104,510 B2 each comprise a single electromagnet, by which the valve element or its closing element can be actuated. In combination with a return element in the form of a spring or a permanent magnet, the valve arrangement can be reliably operated in at least two switching positions, even using a single-acting electromagnet.

Furthermore, U.S. Pat. Nos. 8,104,510 B2 and 8,613,421 B2 describe valve arrangements that provide for a hermetic separation between a valve chamber, into which the valve connections lead, and the actuating unit. Valve arrangements of this type also can be referred to as media-separated valve arrangements. The hermetic separation between the valve chamber and the actuating unit simplifies the use of the valve arrangements in the medical and/or analytical field.

In general, there is a need for compact valve arrangements which take up as little installation space as possible. At the same time, this should not result in losses of efficiency of the valve arrangements, if possible. This relates to the possible pressure ranges and/or flow ranges that can be reliably switched and/or controlled by the valve arrangements.

SUMMARY OF THE INVENTION

The present invention overcomes the shortcomings of known arts, such as those mentioned above.

To that end, the invention provides a device for regulating the flow of a fluid for a valve arrangement, which allows for an increased power density while simultaneously having high efficiency, even given limited installation space. Further options for the control of the device include, by way of example, a mode having low energy uptake and a mode having high efficiency. In addition, the dependability is increased. A valve arrangement provided with such a device for regulating flow covers an expanded field of application, in particular with respect to pressures and/or flow rates to be regulated, for a given installation space. Alternatively, with given requirements on flow rates and/or pressures to be regulated, the installation is should be reduced to the greatest extent possible.

In an embodiment of the device, the actuating unit comprises a first electromagnet and a second electromagnet, which are coupled to the at least one closing element via a coupling mechanism, wherein the first magnet and the second magnet additively act on the at least one closing element to displace the at least one closing element between at least two positions.

According to the invention, due specifically to the fact that both electromagnets additively act on the closing element, a substantially higher magnetic force is provided for actuating the closing element. This makes it possible, on the one hand, to switch substantially higher pressures. Furthermore, for example, cross-sections of the fluid paths in the valve housing are designed to be larger. In addition, due to the increased magnetic force, a better dynamic reaction and a faster response by the device is effectuated.

The first electromagnet and the second electromagnet act on the closing element jointly and in an equally-acting manner. This does not necessarily mean that the two electromagnets are arranged in series. Instead, it also is conceivable that the electromagnets have different force introduction points/force application points with respect to the closing element. Therefore, the two electromagnets are situated approximately next to one another or opposite one another in any way, to utilize a given installation space as effectively as possible.

The coupling mechanism makes it easily possible to connect the first electromagnet and the second electromagnet to the closing element.

The closing element is usually a component of a valve element. The closing element is designed as a flap, a diaphragm, or a lever, without limitation.

The design of the device comprising an actuating unit having two electromagnets which additively act on the closing element is suitable for valve arrangements that have two fluid paths that are defined, for example, by three valve connections. By way of example, the three valve connections can have two inlets and one outlet, or vice versa. A fluid path extends between one of the two inlets and the outlet (or, conversely, between one of the two outlets and the inlet).

Assigned to each fluid path, by way of example, is a valve seat, against which the closing element can come to rest. Therefore, the closing element can seal a first valve seat in a first of the two positions and can seal a second valve seat in a second of the two positions. Therefore, the first fluid path or the second fluid path is selectively blocked or released.

For a given voltage, the utilization of a second electromagnet ideally makes it possible to double the magnetic forces. Overall, for given performance data, a more compact design of the valve arrangement can result. Conversely, improved performance data can result for a given overall size.

The device is suited for controlling and/or regulating microvalves that are used in medical diagnostics and therapy and in medical and industrial analytical technology. Preferably, the valve arrangement is designed as a media-separated valve arrangement, wherein the valve element having the closing element effectuates a hermetic seal between the electromagnet, on the one hand, and the fluid paths, on the other hand.

In at least some embodiments, the valve element to which the closing element is assigned is integrated into the coupling mechanism. In other words, the valve element forms an element of the coupling mechanism. Other embodiments also are conceivable, however, in which the coupling mechanism coupled to a (separate) valve element.

The first electromagnet and the second electromagnet additively act on the closing element. In other words, the first electromagnet and the second electromagnet regularly act jointly on the closing element to displace the closing element into a certain position upon energization of the electromagnets. Accordingly, a return element is provided when there are two electromagnets, the return element comprising, for example, a restoring spring/closing spring or a permanent magnet for return movement. If the first electromagnet acts on the closing element in the direction of a first position of the closing element, and if the second electromagnet acts on the closing element in the direction of a second position of the closing element, an increase or doubling of the magnetic force cannot result.

In one preferred refinement of the device, the first electromagnet and the second electromagnet have effective directions which oppose one another. This relates to a movement of the armature or a polarity of the electromagnets. The coupling mechanism, which is situated between the first electromagnet and the second electromagnet and the closing element, allows for a reversal of the opposing effective directions, as it were, in such a way that the first electromagnet and the second electromagnet jointly additively act on the closing element. In other words, it is not necessary, for example, to situate the two electromagnets, with respect to their effective directions, directly behind one another and to mechanically serially interconnect the electromagnets to add their magnetic forces.

The directional information relates, for example, to directions of flow that result upon energization, and to resultant magnetic forces. It is understood that the opposing pulling directions or the opposing swivel directions occur upon an energization of the electromagnets that is of the same kind. However, for example, the coils of the electromagnets are situated and electrically controlled in such a way that opposing (mechanical) effective directions can result.

According to yet another embodiment of the device, the first electromagnet comprises a first armature and the second electromagnet comprises a second armature, both armatures being assigned to the coupling mechanism. The first armature and the second armature can be directly coupled to the coupling mechanism. By way of example, the coupling mechanism comprises a rocker-like lever, wherein the first armature is assigned to a first end and the second armature is assigned to a second end.

According to one refinement of the device, the first armature and/or the second armature are/is designed as a pull-in armature, wherein the first armature and the second armature preferably have opposing pulling directions. In this way, the magnetic forces of the electromagnets can be doubled when the armatures are assigned to opposite ends of a lever.

According to yet another embodiment, the first armature and/or the second armature are/is designed as pivoted armatures, wherein the first armature and the second armature preferably have opposing swivel directions.

In this way, as well, an addition of the magnetic forces can take place, for example, via a coupling mechanism.

According to yet another embodiment of the device, at least the first electromagnet or the second electromagnet are coupled to a return unit that comprises the magnetic return elements or mechanical return elements.

The mechanical return elements are springs. Springs can be designed as mechanical springs or as liquid springs. The magnetic return elements are permanent magnets. In this way, one of the two states of the closing element are brought about without an external force introduction when the electromagnets are not energized.

According to yet another embodiment of the device, at least the first armature or the second armature are coupled to the coupling mechanism via a compensating element, a buffer spring.

In this way, there is no rigid coupling between the armatures and further components of the coupling mechanism. This can contribute to the avoidance of surges or sudden loads and can smooth out the operating behavior of the electromagnets. Improved control characteristics can result. Furthermore, the accuracy requirements on the components are reduced, thereby simplifying production.

According to yet another embodiment of the device, the coupling mechanism effectuates a forced coupling between the first electromagnet and the second electromagnet. In this way, it is ensured that the first electromagnet and the second electromagnet additively act on the closing element. The forced coupling also can be referred to as mechanical forced coupling.

According to yet another embodiment of the device, the coupling mechanism comprises a pivoting lever on which the first electromagnet and the second electromagnet act. By way of example, the pivoting lever is designed as a rocker or a rocker arm. According to at least one exemplary embodiment, the first electromagnet is assigned to a first end of the pivoting lever and the second electromagnet is assigned to a second end of the pivoting lever.

Alternative embodiments of pivoting levers also are conceivable, however, in which the first electromagnet and the second electromagnet jointly additively act on the pivoting lever despite their opposing effective directions.

According to yet another embodiment of the device, the actuating unit is hermetically separated from at least one fluid path. This relates, in particular, at least to the first electromagnet and the second electromagnet. Preferably, essential components or all components of the coupling mechanism are hermetically separated from at least one fluid path or the valve chamber. In this way, the valve arrangement is suitable for diagnostic and medical purposes. The cleaning and maintenance of the valve arrangement and the actuating unit can be highly simplified.

According to yet another embodiment of the device, the closing element effectuates a seal between the at least one fluid path and the actuating unit, wherein at least sections of the closing element are deflectable to close or open the at least one valve seat.

According to one exemplary embodiment, the closing element is therefore used not only for sealing the particular valve seat in one of the at least two positions. The closing element itself also effectuates the hermetic separation of the actuating unit from the at least one fluid path or the valve chamber. This has the advantage that no further components are required. One and the same closing element can perform a plurality of functions.

According to yet another embodiment of the device, the closing element comprises a diaphragm. The diaphragm can comprise a plurality of sealing sections, each of which is assigned to a valve seat. At least sections of the diaphragm as such are deflectable to selectively bring the sealing sections to sealingly rest against the valve seats. In addition, the diaphragm itself also can contribute to the hermetic separation of the fluid path from the actuating unit.

According to yet another embodiment, the closing element is assigned to a valve element which comprises a support part, such as a deflectable support part. The support part is formed, for example, from a metal material. Preferably, the closing element is substantially formed from a flexible or rubber-elastic material. The valve element with the support part and the closing element can be produced, for example, by encapsulation of the support part, by vulcanization, or in a similar way. The coupling mechanism can act on the closing element via the support part. In at least some exemplary embodiments, the support part itself can form one component of the coupling mechanism. The support part itself can have a lever-like or rocker-like design.

According to yet another exemplary embodiment of the device, the first electromagnet and the second electromagnet can be jointly operated in an energized state and in a non-energized state to displace the closing element into a first closed position and a second closed position, wherein the first closed position is assigned to the energized state and the second closed position is assigned to the non-energized state. Each of the two closed positions can block an assigned fluid path and can release another fluid path.

According to yet another embodiment of the device, the first electromagnet and the second electromagnet can be jointly energized in parallel and in series to provide at least a first operating mode and a second operating mode. In the case of a serial energization (in series), for a given voltage, one-half of the coil power and, therefore, one-half of the magnetic force result as compared to the energization of a single electromagnet. In the case of a parallel energization, however, coil power is doubled, combined with a doubled magnetic force.

One possible application of the ability to be energized in parallel and in series is that of operating the device in a pull-in mode (parallel activation) and in a holding mode (serial activation). This can substantially reduce the power required in the holding mode when it is usually only necessary to apply low forces.

A typical switching process (electrical activation of the valve) comprises, by way of example, a short time period in which the coils of the electromagnets are energized in parallel. Accordingly, there is a power demand of 100% for a given voltage. Such a time period, which also can be referred to as pull-in time, for example, is approximately 100 ms (milliseconds), by way of example. After the pull-in time, the device is transferred from the pull-in mode into a holding mode which comprises, by way of example, a serial activation of the coils of the electromagnets. Accordingly, only one-fourth (25%) of the power is required for a given voltage. Therefore, the energy consumption is substantially reduced, on the one hand. Furthermore, substantially less energy is converted to heat.

As compared to parallel energization, serial energization enables power to be reduced to one-fourth. Other operating modes are conceivable, in which parallel and serial energization can be used.

According to one exemplary refinement, the electromagnets, in particular their coils, are accommodated in one shared housing. A double-coil arrangement for the coils of the two electromagnets results. In an embodiment, the electromagnets utilize a shared magnetic yoke.

The invention also includes a valve arrangement which comprises a device for regulating flow according to at least one of the embodiments described herein. By way of example, such a valve arrangement is designed as a flapper valve arrangement, a diaphragm valve arrangement, or an isolating-lever valve arrangement.

BRIEF DESCRIPTION OF THE DRAWINGS

Further features and advantages of the invention become apparent from the description of multiple preferred exemplary embodiments that follows, with reference to the drawings. In the figures.

BRIEF DESCRIPTION OF THE DRAWINGS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Different embodiments of devices for regulating flow for valve arrangements, each of which comprises an actuating unit having two electromagnets, are described with reference to FIGS. 1 to 7, which are described in greater detail in the following.

A valve arrangement 10 comprising a so-called flapper valve, is illustrated with reference to FIGS. 1 and 2. The valve arrangement 10 is provided with a device 100 for regulating flow.

The valve arrangement 10 comprises a valve housing 12 that is provided with a first connection 14, a second connection 16 and a third connection 18. The housing 12 is formed, by way of example, by a first housing part 20 and a second housing part 22. The connections 14, 16, 18 are formed on the housing part 20. A first valve seat 24 is assigned to the first connection 14. A second valve seat 26 is assigned to the second connection 16.

The valve arrangement 10 further comprises a valve element 30 which has a closing element 32. The valve element 30 is accommodated, by way of example, between the housing parts 20 and 22. The closing element 32 comprises a first section 34 and a second section 36. The sections 34, 36 also can be referred to as sealing sections or closing sections. The first section 34 is assigned to the first valve seat 24. The second section 36 is assigned to the second valve seat 26. The valve element 30 is designed in such a way that one of the two sections 34, 36 can come to rest in a sealing manner against the valve seat 24, 26 assigned thereto, when the other section 34, 36 is lifted off its valve seat 24, 26. Therefore, one of two valve paths formed between the connections 14, 16, 18 can be alternatively blocked or released. A first liquid path is defined between the connections 14 and 18. A second liquid path is defined between the connections 16 and 18.

The connection 18, at the least, leads into a valve chamber 38, which is delimited by the closing element 32. Depending on the position of the closing element 32, the connection 14 or the connection 16 is fluidically connected to the valve chamber 38. This is possible using only one closing element 32.

The valve element 30 further comprises a support 40 that supports the closing element 32, by way of example. The support 40 usually consists of a material which is substantially stiffer than the material of which the closing element 32 consists, i.e., steel or another metal material, for example. By way of example, the closing element 32 can comprise a soft component 42. The component can be a rubber-elastic material, for example, in this case. The more detailed configuration of the valve element 30 having the closing element 32 is shown in the exploded perspective depiction in FIG. 2.

The valve element 30 further comprises a receptacle seal 44 and an edge 46 which is designed as a circumferential edge, by way of example. In the installed state of the valve housing 30, the receptacle seal 44 is seated in a groove 48, which is jointly formed by the housing parts 20, 22 of the housing 12. In this way, the valve chamber 38 can be hermetically sealed by the valve element 30, in particular by the closing element 32. Therefore, by way of example, the housing part 22 is not contacted by the fluid that flows through the valve arrangement 10. The fluid can be, for example, a gaseous medium or a liquid medium.

The device 100 is used for regulating flow for the valve arrangement 10. The device 100 comprises an actuating unit 50. The actuating unit 50 comprises a first electromagnet 52 and a second electromagnet 54. The electromagnets 52, 54 are accommodated in a shared housing (not explicitly shown in FIG. 1), by way of example. The electromagnets 52, 54 are situated in direct spatial proximity to one another.

The first electromagnet 52 has an effective direction 56. The second electromagnet 54 has an effective direction 58. The effective directions 56, 58 of the electromagnets 52, 54 are opposed to one another.

The first electromagnet 52 comprises a coil 60 and an armature 62, which is guided in a guide sleeve 64. Furthermore, a stopper 66 is provided. The armature 62 is movably accommodated in the guide sleeve 64. The stopper 66 is fixedly connected to the guide sleeve 64.

The second electromagnet 54 comprises a coil 70 and an armature 72, which is movably accommodated in a guide sleeve 74. Furthermore, the second electromagnet 54 comprises a stopper 76 and a cap 78, which forms a seal. The armature 72 is accommodated in the guide sleeve 74 to be movable between the stopper 76 and the cap 78. The stoppers 66, 76 of the first electromagnet 52 and of the second electromagnet 54 can also be referred to as a magnet core.

The electromagnets 52, 54 are each designed as pull-in magnets, wherein the armatures 62, 72 are designed as pull-in armatures. A pulling direction of the armature 62 of the first electromagnet 52 corresponds to the effective direction 56. A pulling direction of the pull-in armature 72 of the second electromagnet 54 corresponds to the effective direction 58. When the electromagnets 52, 54, in particular their coils 60, 70, are energized, the armatures 62, 72 are pulled in, wherein opposing directions of movement result, in accordance with the effective directions 56, 58. In other words, the armature 62 moves away from the valve element 30 of the valve arrangement 10. In contrast, the armature 72 moves in the direction toward the valve element 30 of the valve arrangement 10.

The device 100 further comprises a coupling mechanism 80, which couples the electromagnets 52, 54 to one another.

Furthermore, the coupling mechanism 80 couples the actuating unit 50 to the valve element 30 to its closing element 32.

The coupling mechanism 80 comprises actuating elements 82, 84, which are designed as actuating forks, by way of example. The actuating element 82 is assigned to the first electromagnet 52. The actuating element 84 is assigned to the second electromagnet 54. One exemplary design of the actuating elements 82, 84 is shown in the exploded depiction, according to FIG. 2.

The actuating elements 82, 84 couple the electromagnets 52, 54, in particular, their armatures 62, 72, to the closing element 32.

Figure 1:
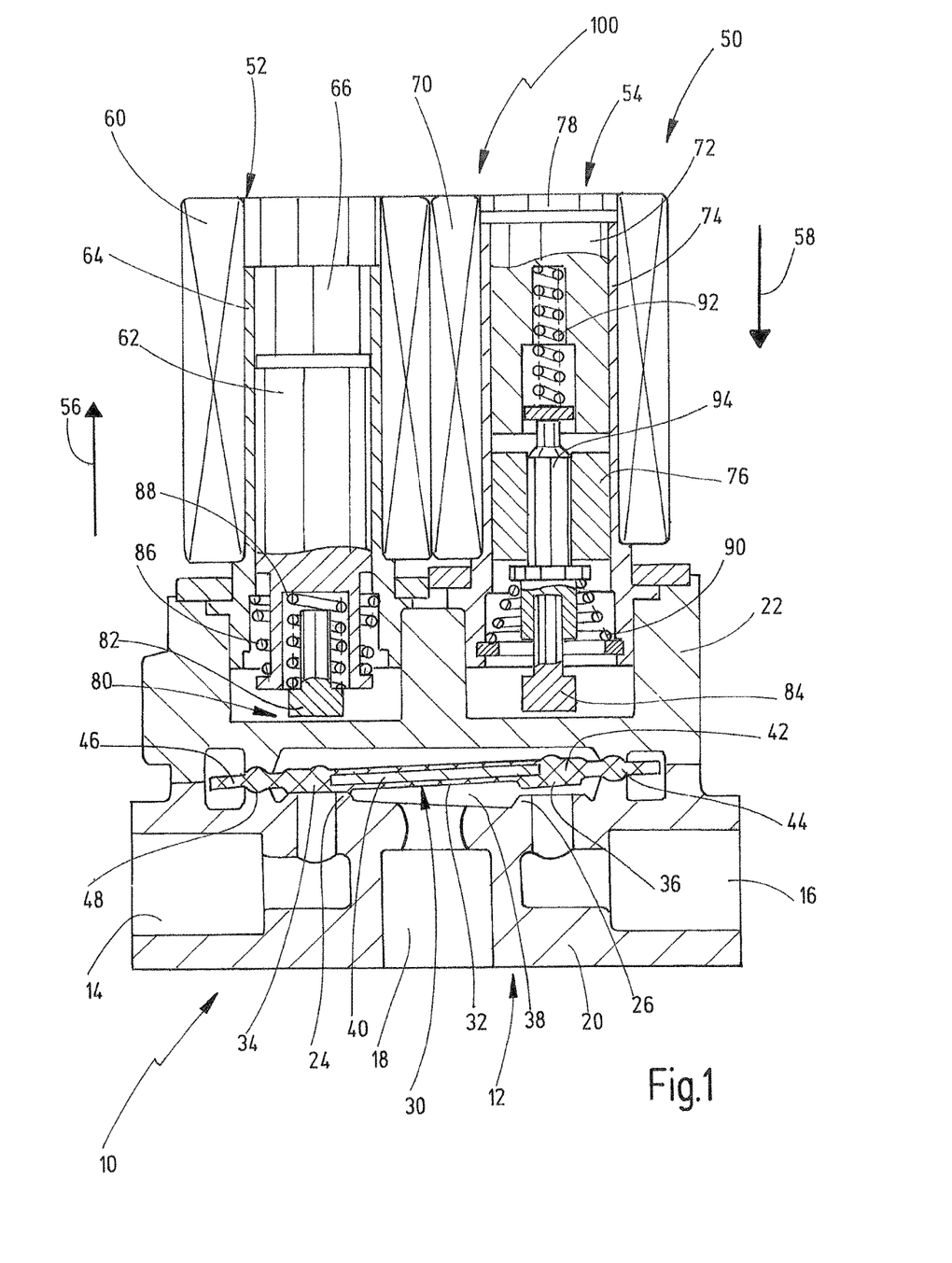
FIG. 1 shows a longitudinal sectional view of a valve arrangement that is provided with a device for regulating flow.

When the electromagnets 52, 54 shown in FIG. 1 are energized, the armatures 62, 72 are pulled in. This effectuates a movement or deflection of the closing element 32, whereby the section 34 of the closing element 32 is lifted off the valve seat 24. Furthermore, the section 36 comes to rest in a sealing manner against the valve seat 26. Accordingly, the state shown in FIG. 1 corresponds to the non-energized state of the electromagnets 52, 54.

The armature 62 of the electromagnet 52, in the energized state, counteracts a pre-load force of a closing spring 86. The armature 72 of the electromagnet 54, in the energized state, counteracts a pre-load force of a closing spring 90. The closing spring 86 forces the armature 62 in the direction of the closing element 32. The closing spring 90 forces the armature 72 away from the closing element 32. In this way, in the non-energized state of the electromagnets 52, 54, a defined idle position of the closing element 32 is effectuated; see the position shown in FIG. 1. The electromagnets 52, 54 supplement one another and additively act on the closing element 32.

Together, the closing springs 86, 90 form return elements of a return unit.

According to the exemplary embodiment illustrated with reference to FIGS. 1 and 2, the coupling between the actuating element 82 and the armature 62 takes place via a buffer spring 88. Furthermore, the coupling between the actuating element 84 and the armature 72 takes place via a buffer spring 92 and a tappet 94. The buffer springs 88, 92 can also be referred to as compensating elements. The compensating elements can optimize the force ratios of the electromagnets 52, 54 and between the electromagnets 52, 54 and the coupling mechanism 80. By way of example, the buffer springs 88, 92 can be used for defining or minimizing the resultant air gap between the armature 62 and the stopper 66 and between the armature 72 and the stopper 76.

The tappet 94, which connects the buffer spring 92 to the actuating element 84, extends through the stopper 76 and is preferably made of a non-magnetic material. The stopper 76 is fixedly accommodated on the guide sleeve 74.

Figure 2:
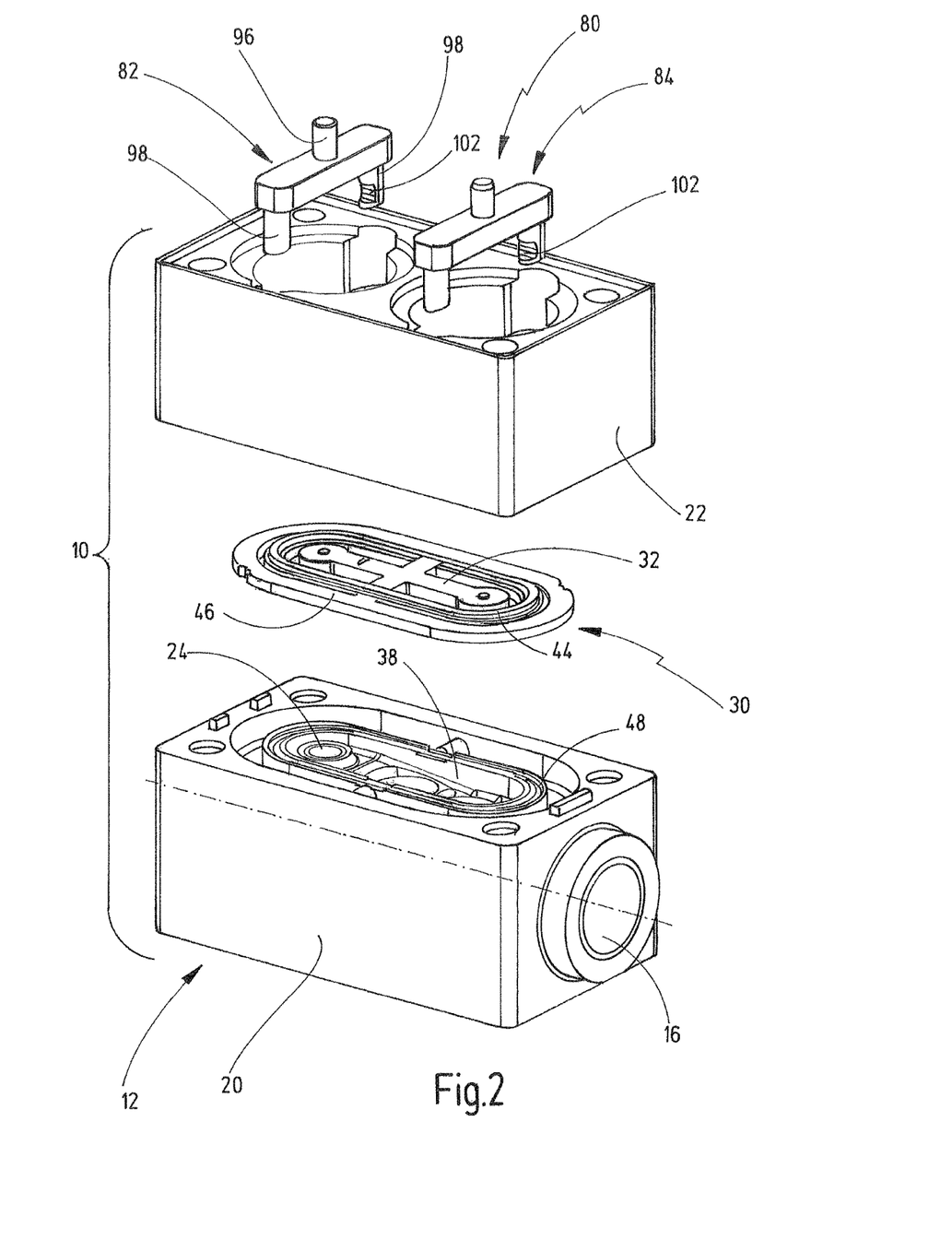
FIG. 2 shows a perspective exploded partial depiction of the arrangement according to FIG. 1.

The actuating elements 82, 84 designed as actuating forks and each comprise a fork shaft 96 and fork arms 98; see also FIG. 2. Formed on each of the fork arms 98 is a carry-along recess 102 for the interlocked carrying-along of the valve element 30 to displace the closing element 32. The carry-along recesses 102 can act on the edge 46 of the valve element 30, for example. The carrying-along can include a pull (see the arrow 56 in FIG. 1) and a push (see the arrow 58 in FIG. 1).

In the valve element 30, the support 40 extends not only within the area delimited by the receptacle seal 44. In addition, at least sections of the support extend in the area of the edge 46. Accordingly, a transfer of force or a transfer of movement from the actuating elements 82, 84 to the sections 34, 36 can take place via the support 40.

Further exemplary embodiments of valve arrangements are illustrated with reference to FIGS. 3 to 6, which valve arrangements are provided with flow-regulating devices that comprise an actuating unit having two electromagnets. It is understood that individual features and individual aspects of one of the exemplary embodiments shown herein can also be transferred to other embodiments.

Figure 3:
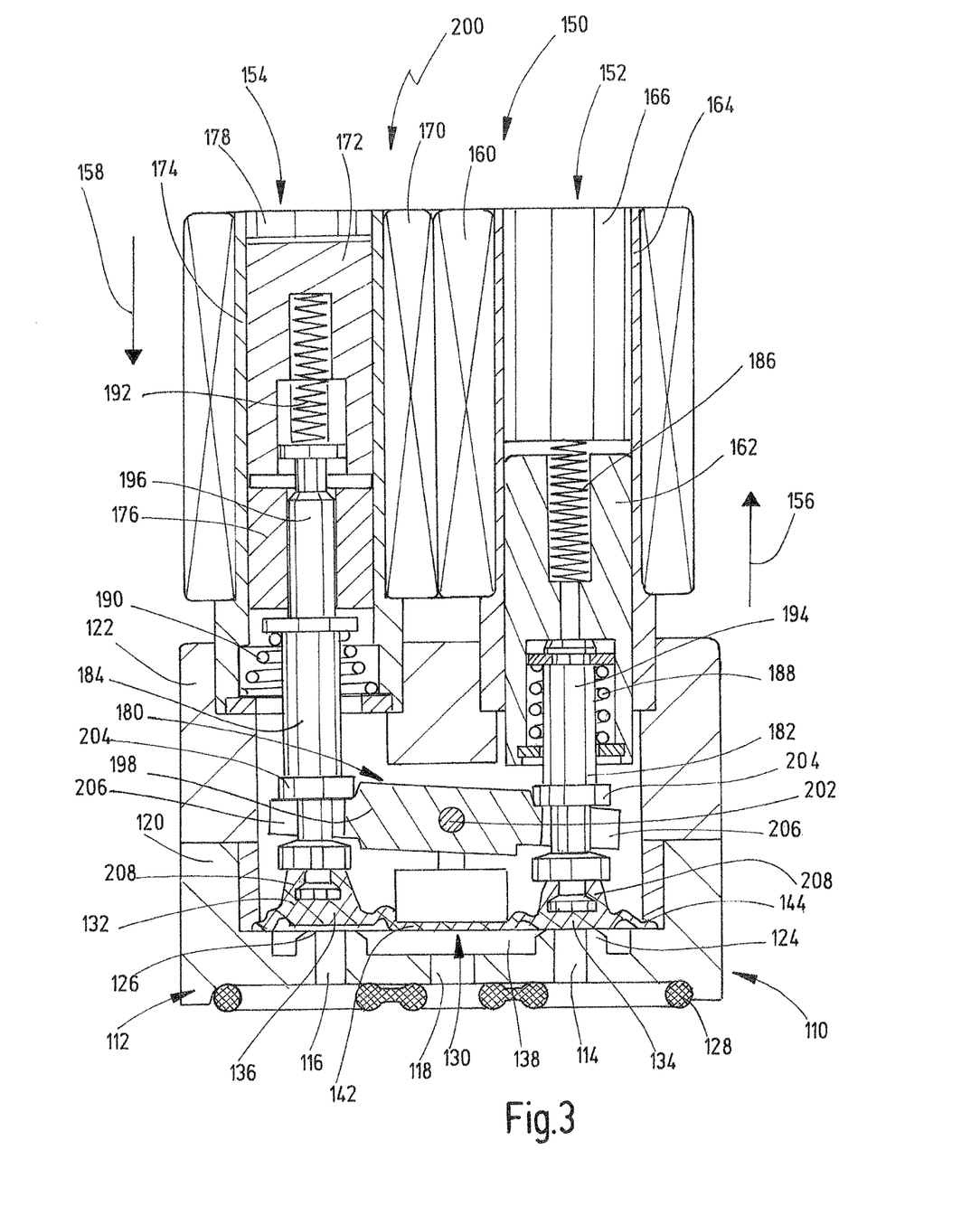
FIG. 3 shows a sectional depiction of one further embodiment of a valve arrangement that is provided with a device for regulating flow.

FIG. 3 illustrates a valve arrangement which is labeled in entirety with reference numeral 110 and comprises a flow-regulating device labeled with reference numeral 200.

The valve arrangement 110 comprises a housing 112 which has, by way of example, a first housing part 120 and a second housing part 122. The housing 112 further comprises a first connection 114, a second connection 116, and a third connection 118, which are formed on the housing part 120, by way of example. A first valve seat 124 is assigned to the first connection 114. A second valve seat 126 is assigned to the second connection 116. Furthermore, a seal labeled with reference numeral 128 is accommodated on the housing 112 and seals the connections 114, 116, 118 as necessary.

The valve arrangement 110 further comprises a valve element 130, which has a closing element 132. The closing element 132 comprises a first section (sealing section) 134 and a second section (sealing section) 136. The section 134 is assigned to the valve seat 124. The section 136 is assigned to the valve seat 126. The valve element 130, in particular, the closing element 132, hermetically seals a valve chamber 138.

The closing element 132 comprises or substantially consists of a soft component 142. The valve element 130 can be referred to, in entirety, as a valve diaphragm. Further provided on the valve element 130 is a receptacle seal, which is labeled with reference numeral 144 and, for example, effectuates a seal between the first housing part 120 and the second housing part 122. For the purpose of actuating the valve arrangement 110, the device 200 comprises an actuating unit 150 which has a first electromagnet 152 and a second electromagnet 154. The electromagnets 152, 154 have opposed effective directions, similarly to the valve arrangement 10 which was illustrated, by way of example, with reference to FIGS. 1 and 2.

The electromagnet 152 comprises a coil 160 and an armature 162 which is movably accommodated in a guide sleeve 164. Furthermore, a stopper, which is labeled with reference numeral 166 and also can be referred to as a magnet core, is provided. The stopper 166 is fixedly connected to the guide sleeve 164.

The electromagnet 154 comprises a coil 170 and an armature 172 which is movably accommodated in a guide sleeve 174. Furthermore, a stopper, which is labeled with reference numeral 176 and is fixedly connected to the guide sleeve 174, is provided. The electromagnet 154 further comprises an end cap 178.

The armature 162 of the electromagnet 152 is situated between the stopper 166 and the valve element 130. The stopper or core 176 of the electromagnet 154 is situated between the armature 172 and the valve element 130.

Similarly, to the design of the valve arrangement 10 according to FIGS. 1 and 2, the electromagnets 152, 154 of the valve arrangement 110 according to FIG. 3 are also designed as pull-in magnets and are provided with pull-in armatures 162, 172. In the energized state of the magnet 152, the armature 162 is moved away from the valve element 130 or the valve seat 124 (see the arrow 156). If the electromagnet 154 is energized, the armature 172 is moved in the direction of the valve element 130 or the valve seat 126; see the arrow 158.

The device 200 further comprises a coupling mechanism 180 which couples the actuating unit 150 to the valve arrangement 110 to the valve element 130.

The coupling mechanism 180 comprises an actuating element 182 which is assigned to the electromagnet 152. Furthermore, an actuating element 184 is provided, which is assigned to the electromagnet 154. The actuating element 182 is designed as a tappet 194. The actuating element 184 is designed as a tappet 196.

Assigned to the first electromagnet 152 is a closing spring 186, which can also be referred to as a return element. Assigned to the second electromagnet 154 is a closing spring 190, which can also be referred to as a return element. The force applied by the spring 186 must be overcome during the movement of the armature 162 when the electromagnet 152 is energized. The force applied by the closing spring 190 must be overcome during the movement of the armature 172 when the electromagnet 154 is energized.

Furthermore, a buffer spring 188 is assigned to the electromagnet 152. Furthermore, a buffer spring 192 is assigned to the electromagnet 154. The actuating element 182 designed as a tappet 194 is coupled to the armature 162, wherein the buffer spring 188 is connected therebetween. The actuating element 184 designed as a tappet 196 is coupled to the armature 172, wherein the buffer spring 192 is situated therebetween.

The coupling mechanism 180 further comprises a pivoting lever 198, which is accommodated on a swivel pin 202. The pivoting lever 198 is coupled to the actuating elements 182, 184, each of which is preferably assigned to one side of the pivoting lever 198. The pivoting lever 198 effectuates a forced coupling of the movement of the electromagnets 152, 154. However, there is no infinitely rigid or stiff coupling, since a buffer spring 188, 192, respectively, is situated between the (movable) armatures 162, 172 and the actuating elements 182, 184 assigned thereto. This has the advantage that there are no excessively high tolerance requirements on the components involved.

By way of example, the pivoting lever 198 comprises, on each of its ends, a carry-along recess 206, which is assigned to a corresponding carry-along section 204 of the tappet 194, 196. In other words, the pivoting lever 198 has a rocker-like configuration. The pivoting lever 198 causes the movement of one of the actuating elements 182, 184 in the direction of the valve element 130 to be converted into an opposite movement of the other actuating element 182, 184 away from the valve element 130. This also corresponds to the opposed effective directions 156, 158 of the electromagnets 152, 154.

At their end facing the valve element 130, the tappets 194, 196 are designed, by way of example, for an interlocked connection to the valve element 130. For this purpose, a joining section 208 is formed on the valve element 130 and, by way of example, surrounds an end piece of the tappet 194, 196 in a cap-like or grommet-like manner. The joining section 208 can effectuate an interlocked, force-locked and/or bonded coupling between the valve element 130 and the actuating elements 182, 184.

Yet another embodiment of a valve arrangement 210, which is provided with a flow-regulating device labeled with reference numeral 300, is illustrated with reference to FIGS. 4, 5 and 6. Similarly to the embodiments described with reference to FIGS. 1, 2 and 3, the valve arrangement 210 also comprises a housing 212, which is provided with connections 214, 216, 218. A valve seat 224 is assigned to the connection 214. A valve seat 226 is assigned to the connection 216. Furthermore, on the connection side, the housing 212 comprises a seal 228 for the connections 214, 216, 218.

The valve arrangement 210 further comprises a valve element 230 which has a closing element 232 comprising a first section (sealing section) 234 and a second section 236 (sealing section). The first section 234 is assigned to the valve seat 224. The second section 236 is assigned to the valve seat 226. Furthermore, the valve element 230 comprises a support, which is labeled with reference numeral 240 and is formed from a metal material, for example. The closing element 232 is produced, by way of example, from a flexible material or a rubber-elastic material. The valve element 230 further comprises a receptacle seal 244 which hermetically seals a valve chamber 238 with respect to an actuating unit 250.

The valve element 30, which was illustrated with reference to FIGS. 1 and 2, is designed as a valve flap or an isolating lever, for example, wherein partially flexible sections are provided. The valve element 130, which was illustrated with reference to FIG. 3, is designed as a diaphragm, for example. The valve element 230, which is shown in FIG. 4, is designed as a pivoting element or a closing lever which is deflectable, due to the elasticity of the support 240 and the closing element 232, to reciprocally block or release either the valve seat 224 or the valve seat 226.

Figure 4:
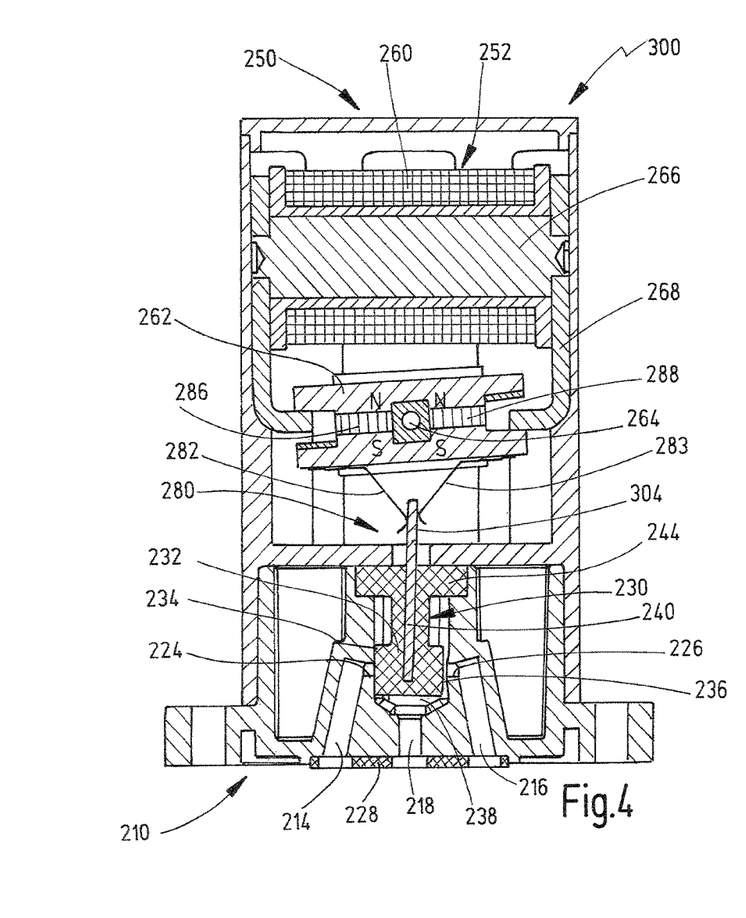
FIG. 4 shows a sectional view of one further embodiment of a valve arrangement which is provided with a device for regulating flow.
Figure 5:
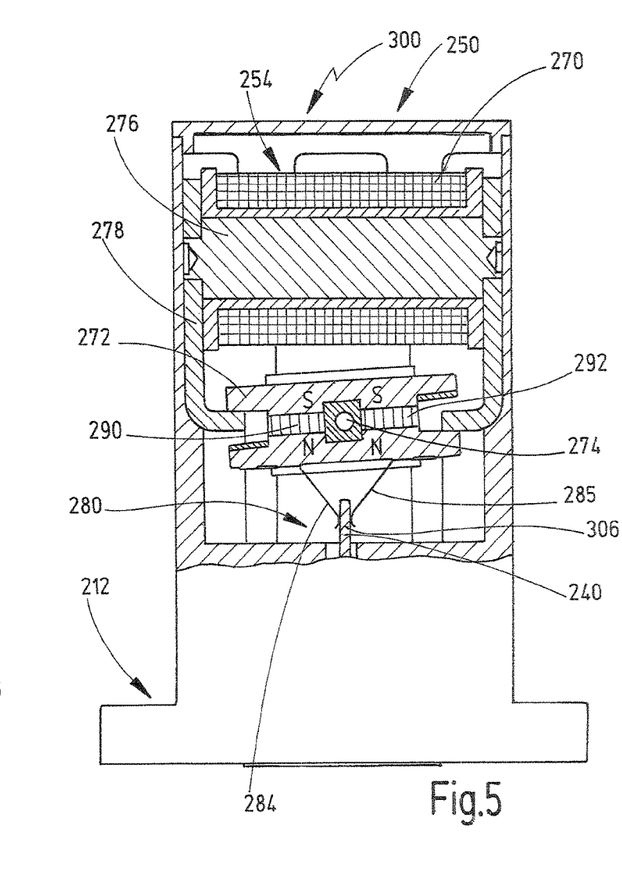
FIG. 5 shows one further, partially cutaway view of the arrangement according to FIG. 4, wherein the cutting plane is offset from the cutting plane selected in FIG. 4.

For the purpose of actuating the valve element 230, the device 300 having the actuating unit 250 comprises an arrangement which has a first electromagnet 252 (FIG. 4) and a second electromagnet 254 (FIG. 5).

The spatial arrangement of the electromagnets 252, 254 is illustrated with reference to FIG. 6, which shows a schematic, highly simplified depiction of a lateral partial view of the actuating unit 250 according to FIGS. 4 and 5.

In other words, the electromagnets 252, 254 are situated one behind the other according to the view utilized in FIGS. 4 and 5.

The first electromagnet 252 comprises a coil 260 and an armature 262, which is designed as a pivoted armature. Furthermore, a core labeled with reference numeral 266 is provided. A yoke 268 extends between the core 266 and the armature 262 on both sides of the coil 260.

The second electromagnet 254 comprises a coil 270 and an armature 272 which is designed as a pivoted armature. Furthermore, the electromagnet 254 comprises a core 276. A yoke 278 extends between the core 276 and the armature 272 on both sides of the coil 270.

The armatures 262, 272 are designed as pivoted armatures and can pivot about a pivot axis 264, 274, respectively. FIG. 6 shows that the pivot axes 264, 274 can be formed by a shared part.

The actuating unit 250 is connected to the valve element 230 via a coupling mechanism 280. Assigned to the coupling mechanism are actuating elements which are designed, by way of example, as leaf springs and effectuate a pivoted carry-along of the valve element 230 when the armatures 262, 272 are pivoted.

The pivoted armature 262 is provided with actuating elements 282, 283, which are designed, for example, as actuating springs in the form of leaf springs. The pivoted armature 272 is provided with actuating elements 284, 285 which are designed as actuating springs in the form of leaf springs. The actuating elements 282, 283 are assigned to sides of a carry-along section 304 of the support 240 positioned opposite each other. The actuating elements 284, 285 are assigned to sides of a carry-along section 306 of the support 240 positioned opposite each other. Depending on the present pivot position of the armature 262, 272, the actuating elements 282, 283 or 284, 285, respectively, force the support 240 into one of two directions, to which a corresponding switching position of the closing element 232 is assigned.

The actuating unit 250 further comprises a return element which is designed as a permanent-magnet return unit. The return unit comprises at least one permanent magnet 286, 288 which is assigned to the pivoted armature 262. Preferably, two permanent magnets 286, 288 are provided. Furthermore, the return unit comprises, by way of example, at least one electromagnet 290, 292, which is assigned to the pivoted armature 272, on sides of the electromagnet 254. Preferably, two permanent magnets 290, 292 are provided.

Similarly, to the previously described closing springs 86, 90, the permanent magnets 286, 288, 290, 292, each also counteract a force (here: magnetic force), which is generated in the energized state of the electromagnets 252, 254.

In FIGS. 4 and 5, a polarity of the permanent magnets 286, 288, 290, 292 is indicated using the letters N (north pole) and S (south pole). The polarity of the permanent magnets 286, 288 is opposed to the polarity of the permanent magnet 290, 292. This means that the electromagnets 252, 254 have opposed effective directions (in the sense of Lenz's law) to be able to ultimately additively act on the valve element 230.

Figure 6:
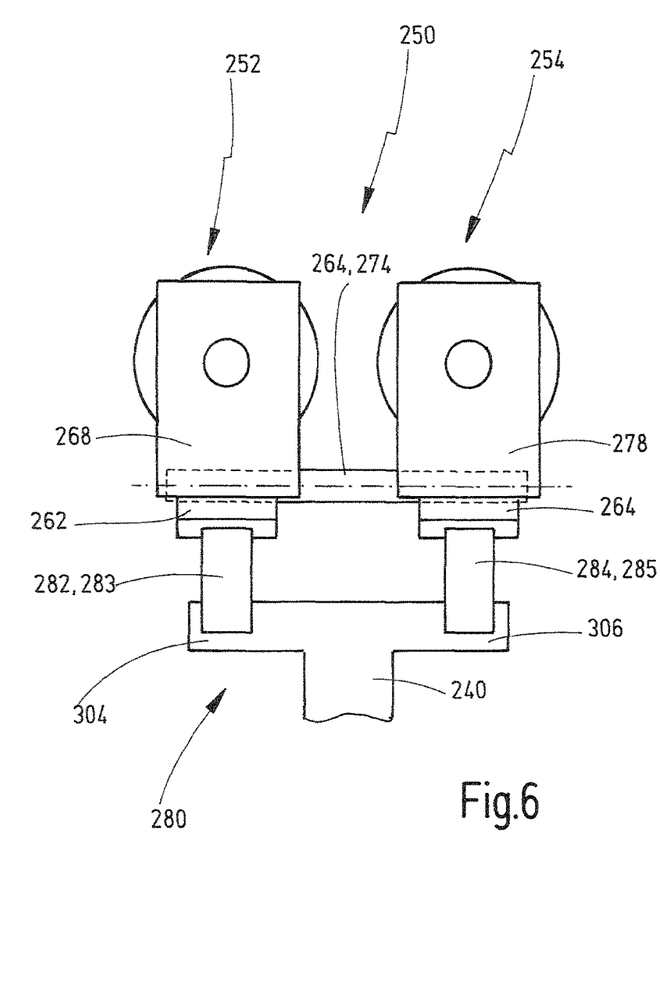
FIG. 6 shows a schematic, highly simplified, lateral partial view of an actuating unit for the arrangement shown in FIGS. 4 and 5, for further illustration.

Furthermore, it becomes apparent from FIG. 6 that the support 240 provided with the carry-along sections 304, 306 can be designed to be T-shaped, by way of example, to enable the electromagnets 252, 254 to apply an additive force to the carry-along sections 304, 306 to actuate the valve arrangement 210.

Figure 7:
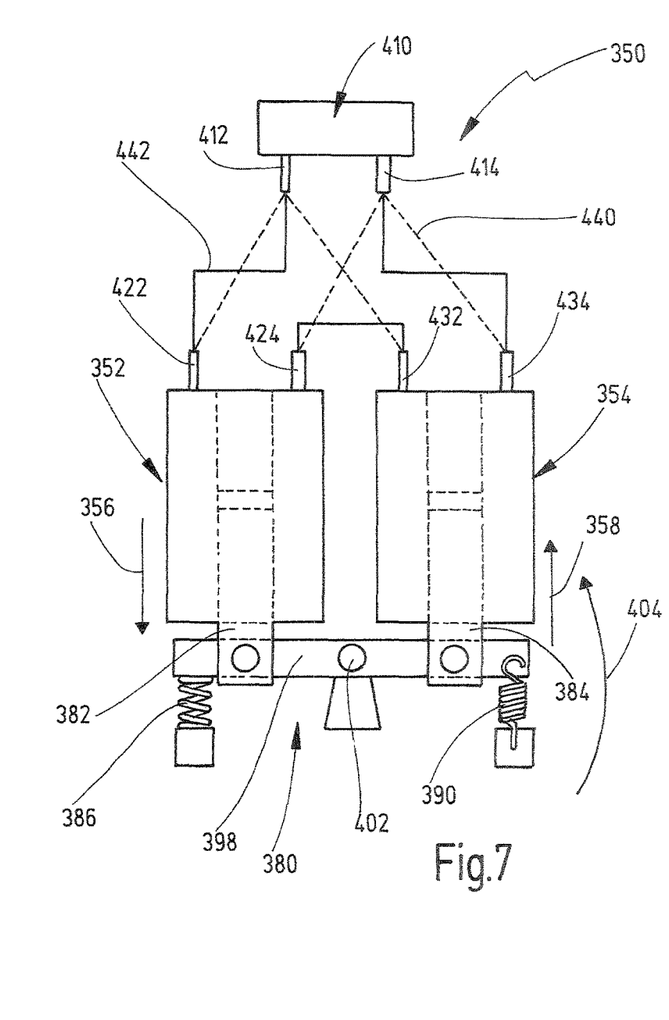
FIG. 7 shows a schematic, highly simplified depiction of one further embodiment of an actuating unit for a device for regulating flow.

FIG. 7 illustrates, with reference to a schematically highly simplified depiction, yet another embodiment of an actuating unit 350 for a valve arrangement. The actuating unit 350 can be combined with the above-described valve configurations.

The actuating unit 350 comprises a first electromagnet 352 and a second electromagnet 354, which have opposed effective directions 356, 358. Assigned to the actuating unit 350 is a coupling mechanism 380, which comprises actuating elements 382, 384. The actuating element 382 is coupled to an armature of the first electromagnet 352, by way of example. The actuating element 384 is coupled to an armature of the second electromagnet 354, by way of example. The coupling mechanism 380 further comprises a pivoting lever 398 which can pivot about an axis 402. An arrow labeled with reference numeral 404 in FIG. 7 describes a pivoting direction of the pivoting lever 398 when the electromagnets 352, 354 are energized. The movement of the pivoting lever 398 induces a synchronization or forced coupling of the electromagnets 352, 354.

As described above, a closing spring (compression spring) 386 is assigned to the first electromagnet 352, by way of example. Furthermore, a closing spring (extension spring) 390 is assigned to the second electromagnet 354, by way of example.

Furthermore, a control device is schematically indicated in FIG. 7 by a block labeled with reference numeral 410 and comprises, by way of example, a voltage source or is coupled to a voltage source. The control device 410 comprises contacts 412, 414, wherein the contact 412 corresponds to a first contact type and the contact 414 corresponds to a second contact type. The contact type can be assigned to a corresponding polarity, by way of example.

The electromagnets 352, 354, in particular, their coil windings, are also provided with contacts 422, 424, 432, 434. The contacts 422, 424 are assigned to the first electromagnet 352. The contacts 432, 434 are assigned to the second electromagnet 354. The type of the contacts 422, 432 corresponds to the contact 412. The type of the contacts 424, 434 corresponds to the contact 414.

FIG. 7 illustrates different activation modes for the electromagnets 352, 354, which are can be used, in principle, in each of the embodiments illustrated with reference to FIGS. 1 to 6.

Dashed lines, which are labeled with reference numeral 440, between the contacts 412, 414 and the contacts 422, 424, 432, 434 illustrate a parallel activation of the electromagnets 352, 354. Solid lines, which are labeled with reference numeral 442, between the contacts 412, 414 and the contacts 422, 424, 432, 434 illustrate a serial interconnection of the electromagnets 352, 354.

In the case of the parallel interconnection 440, a high magnetic force is generated, which is associated with a high-power demand. In the case of the serial activation 442, a low magnetic force is generated, which is associated with a lower power demand.

It is understood that it is possible to switch between the activation modes. This can comprise, by way of example, a parallel activation for a pull-in time period and a subsequent switch to a serial activation for a reduced holding force. In this way, a high magnetic force can be initially provided, on the one hand. To hold the load, however, frequently only a relatively low force is required, which can be provided using a lower amount of energy.

As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. A device for regulating the flow of a fluid, comprising:
   a valve housing having a first valve port, a second valve port and a third valve port;
   a first fluid path that extends in the valve housing between the first valve port and the second valve port;
   a second fluid path that extends in the valve housing between the second valve port and the third valve port;
   a first valve seat disposed at the first fluid path;
   a second valve seat disposed at the second fluid path;
   a closing element that arranged to engage the first valve seat or to disengage from the first valve seat, to block or release the first fluid path; and
   an electromagnetic actuating unit that actuates the closing element;
   wherein the actuating unit comprises a first electromagnet and a second electromagnet;
   wherein the first electromagnet and the second electromagnet are coupled to the closing element via a coupling mechanism;
   wherein the first electromagnet comprises a first armature and the second electromagnet comprises a second armature;
   wherein the first armature and the second armature form part of the coupling mechanism;

wherein the first electromagnet and the second electromagnet additively act on the closing element to move the closing element between a first position and a second position;

wherein the closing element is further arranged to engage the second valve seat or to disengage from the second valve seat, to block or release the second fluid path; and wherein the closing element, in the first position, blocks the first fluid path and enables the second fluid path, and, in the second position, blocks the second fluid path and enables the first fluid path.

2. The device according to claim 1, wherein the first electromagnet and the second electromagnet have opposing effective directions.

3. The device according to claim 1, wherein one of the first armature and the second armature is arranged as a pull-in armature.

4. The device according to claim 1, wherein one of the first armature or the second armature is arranged as a pivoted armature.

5. The device according to claim 1, wherein one of the first electromagnet and the second electromagnet is coupled to a return unit comprising one of magnetic return elements and mechanical return elements.

6. The device according to claim 1, wherein one of the first armature and the second armature is coupled to the coupling mechanism via a compensating element.

7. The device according claim 1, wherein the coupling mechanism forms a forced coupling between the first electromagnet and the second electromagnet.

8. The device according to claim 1, wherein the coupling mechanism comprises a pivoting lever on which the first electromagnet and the second electromagnet act.

9. The device according to claim 1, wherein the actuating unit is sealed off from the first fluid path.

10. The device according to claim 1, wherein the closing element forms a seal between the first fluid path and the actuating unit; and wherein the closing element is at least sectionally deflectable to close or open the first valve seat.

11. The device according to claim 1, wherein the closing element comprises a diaphragm.

12. The device according to claim 1, wherein the closing element is formed at a valve element that comprises a deflectable support.

13. The device according to claim 1, wherein the first electromagnet and the second electromagnet are jointly operated in an energized state and in a non-energized state to bring the closing element into the first position and the second position.

14. The device according to claim 1, wherein the first electromagnet and the second electromagnet are arranged to be jointly energized in parallel, to provide a first operating mode, and in series, to provide a second operating mode.

15. The device according to claim 1, wherein the closing element comprises a diaphragm, the diaphragm comprising a first sealing section that is arranged to seal off the first valve seat, and a second sealing section that is arranged to seal off the second valve seat.

16. The device according to claim 1, wherein the first electromagnet and the second electromagnet are jointly operated in an energized state and in a non-energized state to bring the closing element into the first position and the second position; wherein in the first position the first valve seat is closed by the closing element; wherein in the second position the second valve seat is closed by the closing element; and wherein the first position is in the energized state and the second position is in the non-energized state.

17. A valve arrangement incorporating a regulating device for regulating the flow of a fluid, the regulating device comprising:

a valve housing having a first valve port, a second valve port and a third valve port;

a first fluid path that extends in the valve housing between the first valve port and the second valve port;

a second fluid path that extends in the valve housing between the second valve port and the third valve port;

a first valve seat disposed at the first fluid path;

a second valve seat disposed at the second fluid path;

a closing element that arranged to engage the first valve seat or to disengage from the first valve seat, to block or release the first fluid path; and an electromagnetic actuating unit that actuates the closing element;

wherein the actuating unit comprises a first electromagnet and a second electromagnet;

wherein the first electromagnet and the second electromagnet are coupled to the closing element via a coupling mechanism;

wherein the first electromagnet comprises a first armature and the second electromagnet comprises a second armature;

wherein the first armature and the second armature form part of the coupling mechanism;

wherein the first electromagnet and the second electromagnet additively act on the closing element to displace the closing element between a first position and a second position, wherein the closing element is further arranged to engage the second valve seat or to disengage from the second valve seat, to block or release the second fluid path, and wherein the closing element, in the first position, blocks the first fluid path and enables the second fluid path, and, in the second position, blocks the second fluid path and enables the first fluid path.

* * * * *